United States Patent [19]  
Braun et al.

[11] 3,953,260  
[45] Apr. 27, 1976

[54] GOSSYPOL, AN ABUNDANT, LOW-COST IRON DEACTIVATOR, POT-LIFE EXTENDER, AND PROCESSING AID FOR HTPB PROPELLANTS

[75] Inventors: John D. Braun; M. Frank Pickett, both of Ridgecrest, Calif.; Howard W. Gerrish, Jr., Twin Falls, Idaho; Hans B. Jonassen, New Orleans, La.

[73] Assignee: The United States of America as represented by the Secretary of the Navy, Washington, D.C.

[22] Filed: May 23, 1975

[21] Appl. No.: 580,385

[52] U.S. Cl. ............................ 149/19.92; 149/19.4; 149/19.9
[51] Int. Cl.$^2$ ........................................ C06B 45/10
[58] Field of Search ............... 149/19.4, 19.9, 19.91, 149/19.92, 20

[56] References Cited
UNITED STATES PATENTS

| | | | |
|---|---|---|---|
| 3,695,952 | 10/1972 | Allen | 149/19.9 |
| 3,801,385 | 4/1974 | Mastrolia et al. | 149/20 |
| 3,867,354 | 2/1975 | Betts et al. | 149/19.9 X |
| 3,888,707 | 6/1975 | Rothenstein | 149/19.4 |

*Primary Examiner*—Edward A. Miller
*Attorney, Agent, or Firm*—R. S. Sciascia; Roy Miller; Lloyd E. K. Pohl

[57] ABSTRACT

In a method wherein propellant ingredients including a hydroxy terminated binder, an isocyanate curative therefor and transition metal compounds or traces thereof are mixed, worked into a suitable container and allowed to cure, gossypol is used to prolong the potlife of the propellant mix. Gossypol is dissolved in a portion of the hydroxy terminated binder material and the solution is utilized as a portion of the total binder. Final formulations containing from 0.02 to 0.1 weight percent gossypol are preferred although more gossypol may be used.

7 Claims, No Drawings

GOSSYPOL, AN ABUNDANT, LOW-COST IRON DEACTIVATOR, POT-LIFE EXTENDER, AND PROCESSING AID FOR HTPB PROPELLANTS

BACKGROUND OF THE INVENTION

1. Field of the Invention:

This invention relates to materials which are useful in extending the pot life of propellants with hydroxy terminated polymeric binders, cured with multiisocyanate curatives.

2. Description of the Prior Art:

Hydroxy terminated polymeric binders are well known and widely used in solid rocket propellants. One example is hydroxy terminated polybutadiene (HTPB). It and other hydroxy terminated binders are normally cured by means of diisocyanates and other multi-isocyanates. When an isocyanate curing agent is added, the viscosity of the HTPB binder begins to increase immediately. Once an isocyanate curing agent is added, the time remaining in which the viscosity of HTPB propellant or the like is low enough so that one can work with it is relatively short. Consequently, during a propellant mix cycle, the curative is generally added near the end of the cycle. This usually leaves enough time for the person doing the mixing to finish working the propellant into the motor, quality control carton or whatever else it is to be in before it becomes unworkable. However, should the propellant contain a transition metal compound (such as, for example, an iron compound as a burning rate accelerator) as propellants often do, the working time, i.e., pot life, of the propellant sometimes becomes unworkably short after the curative is added. Many transition metal compounds, including iron compounds, act as catalysts in accelerating the cure reaction, reducing the working time of the propellant.

SUMMARY OF THE INVENTION

It has been found that gossypol, a naturally occurring, readily available compound, can be utilized to increase the pot life of HTPB and other hydroxy terminated polymeric binder materials after a curative has been added. Gossypol does this by countering the catalytic effect of the transition metal compounds present. A non-catalytic gossypol-iron complex is believed to be formed. According to this invention, a good working range may be achieved by adding enough gossypol to produce a final propellant which contains on the order of from about 0.02 weight percent up to about 0.1 weight percent gossypol. However, it is not intended to limit the amount of gossypol used to the 0.02 to 0.1 weight percent range. A gossypol-acetic acid complex may also be used to increase pot-life, though the complex is not as effective as pure gossypol.

DESCRIPTION OF THE PREFERRED EMBODIMENT

Gossypol is a naturally occurring compound with the structure:

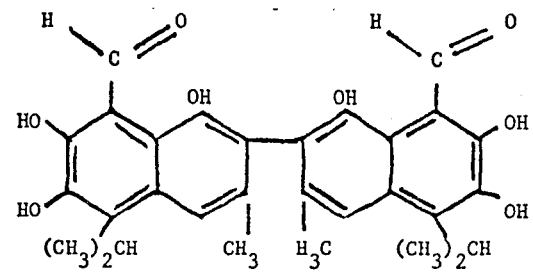

It is normally obtained from cottonseed, in the form of a gossypolacetic acid complex. Raw cottonseed oil is washed with water, which isolates a gum. The gum is dissolved in methyl ethyl ketone and the solution treated with glacial acetic acid to obtain gossypol-acetic acid complex. To obtain the pure compound, one neutralizes the acetic acid complex with a base. The resulting gossypol is taken up in ether and recrystallized from an ether-xylene solution.

Gossypol is somewhat sensitive to air oxidation and should be stored under inert gas, away from light and at a reduced temperature.

To incorporate gossypol into a propellant, the gossypol is first dissolved in a small amount of HTPB or other hydroxy terminated binder with the aid of ether. An ether-gossypol solution is added to the binder and a homogeneous solution is obtained. The ether is then removed under vacuum at a moderate temperature of about 40°C. or less. Enough gossypol should be added so that, after the ether is removed, the resulting binder-gossypol solution contains about 12½ percent by weight gossypol.

Once it is made up, a binder-gossypol solution is used in a propellant mix as part of the binder. According to this invention, it is preferred to use enough of the binder-gossypol solution to yield a final propellant mix which contains on the order of from 0.02 to about 0.1 weight percent gossypol. However, more gossypol does not deleteriously effect the propellant, and there is evidence to show that increased amounts of gossypol give further increases in pot life in certain propellants. To use it, the required amount of binder gossypol is merely added to a propellant mix containing all the other ingredients (binder, oxidizer, fuel, antioxidant, burn rate modifiers, isocyanate curatives, etc.)

In developing this invention, studies of propellant containing 13 weight percent binder (HTPB, antioxidant, gossypol and isophorone diisocyanate curative) and 87 weight percent solids [aluminum (15 $\mu$), ammonium perchlorate (400 $\mu$, 200 $\mu$, and 5 $\mu$), and yellow iron oxide burning rate accelerator]. The antioxidant used was either CAO-14 (a hindered bis-phenol or agerite white (a hindered aromatic amine). The following table was obtained.

TABLE

| MIX NO. | % GOSSYPOL | END-OF-MIX VISCOSITY, KILO-POISE | TIME TO 40 KILO-POISE VISCOSITY, HRS., AT AT 100–105°F | CURED PROPELLANT MECHANICAL PROPERTIES | | | |
|---|---|---|---|---|---|---|---|
| | | | | TENSILE STRENGTH, $\sigma$ | ELONGATION AT MAX. TENSILE, $E_M$ | ELONGATION AT BREAK, $E_B$ | INITIAL MODULUS, E |
| 6874 | NONE (W. 0.1% CAO-14) | 18 | 1.4 | 138 PSI. | 16% | 25% | 1527 PSI. |
| 6875 | 0.02%, W. 0.1% CAO-14 ANTIOXIDANT | 8.6 | 2.5 | | | | |
| 6876 | 0.05%, W. 0.1% CAO-14 | 7.1 | 3.4 | 125 | 18 | 29 | 1370 |
| 6877 | 0.10%, W. 0.1% CAO-14 | 9.4 | 3.8 | 158 | 14 | 22 | 1880 |
| 6888 | 0.10%, W. 0.1% AGERITE WHITE ANTIOXIDANT | 8.0 | 5.0 | 79 | 27 | 50 | 617 |

It will be noted, from the table, that when gossypol was added, the end-of-mix viscosity was significantly reduced (as compared to mix 6874 where no gossypol was added) and that the time to 40 kilo-poise viscosity was significantly increased. In other words, the addition of gossypol made the propellant mix much more workable and significantly increased its workable pot life. In addition, since gossypol is attached by oxygen and various peroxides, it also serves as an antioxidant, stopping oxidative free-radical initiation in the HTPB binder and thereby reducing oxidation of the binder which could adversely affect propellant viscosity and cured aging qualities.

In further tests, evidence was obtained that the gossypol-acetic acid complex obtained from cottonseed meal could be used directly to increase the pot life of hydroxy terminated binders. The effect is not as pronounced as it is with pure gossypol, however, and no processing aid qualities are observed when the gossypol-acetic acid complex is used.

It will be noted, from the above, that gossypol is especially useful in increasing pot life of a propellant mix when the mix contains the transition metal compound (yellow iron oxide burning rate accelerator in the table). All propellants do not, of course, have transition metal compounds deliberately added. However, transition compounds are often present in propellant mixes as impurites. The catalytic effect of the iron oxide in the propellant may in fact be due to a binder-soluble iron compound present as a trace impurity in the oxide. Therefore, even though such catalytic compounds may have not been deliberately added, they can still be present in the propellant. Gossypol can be used to counteract their catalytic effect on the cure rate. Evidence exists that as little as 3-4 ppm. of soluble iron impurity present in HTPB can significantly increase the rate of cure and reduce pot life.

What is claimed is:

1. In a method for mixing propellants comprising the steps of mixing solid particles with a hydroxy terminated polymeric binder, adding an isocyanate curative, working the resulting mixture into a suitable container and allowing it to cure, the improvement residing in adding gossypol to the mix to increase its pot life.

2. A method according to claim 1 wherein an amount of gossypol sufficient to yield a final mix containing 0.02 to 0.1 weight percent gossypol is added.

3. A method according to claim 1 wherein the gossypol added is in the form of a gossypol-acetic acid complex.

4. A method according to claim 1 wherein at least a portion of said solid particles is a transition metal compound.

5. A method according to claim 4 wherein said transition metal compound is an iron compound.

6. A method according to claim 5 wherein said iron compound is yellow iron oxide.

7. A method according to claim 1 wherein gossypol is used as a processing aid in propellant, reducing end-of-mix viscosity in said propellant.

* * * * *